United States Patent
Se et al.

(10) Patent No.: US 11,631,253 B2
(45) Date of Patent: Apr. 18, 2023

(54) PEOPLE COUNTING AND TRACKING SYSTEMS AND METHODS

(71) Applicant: Teledyne FLIR, LLC, Thousand Oaks, CA (US)

(72) Inventors: Shuen Yan Stephen Se, Richmond (CA); Ralph Newton Crabtree, Norcross, GA (US)

(73) Assignee: Teledyne FLIR, LLC, Thousand Oaks, CA (US)

( * ) Notice: Subject to any disclaimer, the term of this patent is extended or adjusted under 35 U.S.C. 154(b) by 0 days.

(21) Appl. No.: 17/024,113

(22) Filed: Sep. 17, 2020

(65) Prior Publication Data

US 2021/0004606 A1    Jan. 7, 2021

Related U.S. Application Data

(63) Continuation of application No. PCT/US2019/024149, filed on Mar. 26, 2019.

(60) Provisional application No. 62/648,861, filed on Mar. 27, 2018.

(51) Int. Cl.
| | | |
|---|---|---|
| G06V 20/52 | (2022.01) | |
| G06T 7/215 | (2017.01) | |
| H04W 4/029 | (2018.01) | |
| H04W 4/80 | (2018.01) | |
| H04N 13/239 | (2018.01) | |
| H04W 4/02 | (2018.01) | |
| G06V 20/64 | (2022.01) | |
| G01S 5/02 | (2010.01) | |

(52) U.S. Cl.
CPC ............ *G06V 20/52* (2022.01); *G01S 5/0264* (2020.05); *G06T 7/215* (2017.01); *G06V 20/647* (2022.01); *H04N 13/239* (2018.05); *H04W 4/027* (2013.01); *H04W 4/029* (2018.02); *H04W 4/80* (2018.02); *G06T 2207/10021* (2013.01); *G06T 2207/30196* (2013.01); *G06T 2207/30242* (2013.01)

(58) Field of Classification Search
CPC ......... G06V 20/50; G06V 20/52; G06V 20/53
See application file for complete search history.

(56) References Cited

U.S. PATENT DOCUMENTS

| | | | |
|---|---|---|---|
| 9,124,778 B1 | 9/2015 | Crabtree | |
| 9,569,786 B2 | 2/2017 | Shaw et al. | |
| 10,217,120 B1 * | 2/2019 | Shin | G01S 5/0263 |
| 11,004,093 B1 * | 5/2021 | Moon | G06V 20/53 |
| 2013/0225199 A1 * | 8/2013 | Shaw | G06Q 30/0201 |
| | | | 455/456.1 |

(Continued)

FOREIGN PATENT DOCUMENTS

WO    WO 2017/052951    3/2017

*Primary Examiner* — Wen W Huang
(74) *Attorney, Agent, or Firm* — Haynes and Boone, LLP

(57) ABSTRACT

Various techniques are provided for counting and/or tracking objects within a field of view of an imaging system, while excluding certain objects from the results. A monitoring system may count or track people identified in captured images while utilizing an employee identification system including a wireless signal receiver to identify and remove the employees from the result. The system includes algorithms for separating employee counts from customer counts, thereby offering enhanced tracking analytics.

20 Claims, 9 Drawing Sheets

(56) References Cited

U.S. PATENT DOCUMENTS

| | | | |
|---|---|---|---|
| 2014/0167920 A1* | 6/2014 | Kamiya | G01S 13/58 340/10.1 |
| 2015/0085111 A1* | 3/2015 | Lavery | G06V 40/20 348/143 |
| 2015/0235237 A1* | 8/2015 | Shaw | H04W 64/00 705/7.29 |
| 2015/0254985 A1* | 9/2015 | Fisher | B60W 30/0953 348/148 |
| 2016/0124071 A1 | 5/2016 | Baxley et al. | |
| 2017/0013409 A1* | 1/2017 | Cerchio | H04W 72/0473 |
| 2017/0308757 A1* | 10/2017 | Nguyen | G06V 40/23 |
| 2018/0109399 A1* | 4/2018 | Cardoso de Moura | H04W 88/06 |
| 2019/0077507 A1* | 3/2019 | Ferris | G01S 5/14 |
| 2019/0159159 A1* | 5/2019 | Murata | G01S 5/021 |

* cited by examiner

PEOPLE COUNTING AND TRACKING SYSTEMS AND METHODS

CROSS-REFERENCE TO RELATED APPLICATIONS

This application is a continuation of International Patent Application No. PCT/US2019/024149 filed Mar. 26, 2019 and entitled "PEOPLE COUNTING AND TRACKING SYSTEMS AND METHODS," which is incorporated herein by reference in its entirety.

International Patent Application No. PCT/US2019/024149 filed Mar. 26, 2019 claims priority to and the benefit of U.S. Provisional Patent Application No. 62/648,861 filed Mar. 27, 2018 and entitled "PEOPLE COUNTING AND TRACKING SYSTEMS AND METHODS" which is hereby incorporated by reference in its entirety.

TECHNICAL FIELD

One or more embodiments of the present disclosure relate generally to object counting and tracking and more particularly, for example, to systems and methods for counting and/or tracking human activity.

BACKGROUND

Many businesses, government agencies, banks, retail establishments, and the like utilize security or surveillance cameras to record activity at the facilities. Such security or surveillance systems typically capture image data and through image analysis identify and track objects within a field of view. Surveillance systems including two-dimensional and three-dimensional people counting imaging cameras have been used for years. In a retail implementation, for example, these cameras may be mounted on the ceiling pointing downwards near the store entrance, exit, checkout lanes, or other areas of customer activity. By detecting, counting and tracking people, these systems provide analytics that the establishment may use to create more effective operational decisions. For establishments with large amounts of employee traffic relative to customer traffic, the analytics are less accurate as the people counts will include both employees and customers. The inaccurate data (mixing employees with customers) could skew analytical results targeting customer activity, leading to a less reliable system. In view of the foregoing, there is a continued need for efficient, accurate and higher quality people counting and tracking systems and methods.

SUMMARY

Various techniques are provided for counting and/or tracking people (e.g., retail customers) within a field of view of one or more imaging systems, while excluding certain people (e.g., retail employees) from the results. In one embodiment, an employee identification technique is implemented in a system including a people counting camera equipped with a wireless signal receiver (e.g., a Bluetooth Low Energy (BLE) signal receiver) operable to receive wireless signals using a wireless personal area networking protocol, wireless local area networking protocol, or similar wireless protocol. The system receives a stream of images of a field of view from the people counting camera and analyzes the images to identify and track people appearing in the field of view. The system also identifies and tracks wireless data associated with wireless devices in range of the wireless signal receiver (e.g., wireless device identifier and received signal level). The resulting people tracking data from the received images (also referred to herein as "camera tracks") and tracked wireless data are then associated. In one embodiment, the wireless devices are wireless employee identification tags (e.g., BLE tags) and tracked people having an associated wireless device are identified as employees. The people counting system may then separate identified employees from customers to produce more accurate customer analytics.

In various embodiments, a method includes a wireless receiver (e.g., a BLE receiver) within a surveillance camera and processing components to match people tracked in received images captured by the surveillance camera to wireless signals tracked by the wireless receiver. In one implementation, the surveillance camera is operated in a retail establishment, with each employee wearing an assigned wireless identification tag (e.g., a BLE tag). The system may exclude employees from customer analytics to produce more accurate results. In one embodiment, the method includes using a camera to capture a series of images of a field of view, identifying objects within the images and tracking the movement of the identified objects through the field of view. The method further includes transforming camera tracks (e.g., the tracked position history of identified object positions in the field of view) into camera-to-wireless tag distances, and predicting wireless characteristics or events that are likely to occur along the camera track if the tracked individual is an employee with a wireless identification tag. For example, the wireless signal strength may be predicted to be strongest at a position on the camera track where the wireless identification tag is closest to the wireless receiver and lowest at a position on the camera track where the wireless identification tag is farthest away from the wireless receiver.

In one embodiment, the system may identify the location relative to the position of a tracked individual and the location of the wireless employee identification tag. For example, if the tag is on the shoulder of the employee, then wireless signal strength may be strongest at a position of the camera track where the person is closest to the camera. If the tag is placed on/in a front or back pocket, then the signal strength may be strongest at a position along the camera track where the person is slightly before or after the camera (e.g., a position in which the person's body is less likely to impede the wireless signal).

In an embodiment of a retail implementation, the camera tracks and tracked wireless data are associated to identify which of the tracked people are employees and which are customers. In various embodiments, the wireless signal strength is tracked for each wireless device, and the wireless strength is smoothed with Gaussian filtering. For each tracked wireless device, the system finds the peak received signal strength indicator (RSSI) received by the wireless receiver around a predicted peak time determined for a camera track. The system also finds the lowest RSSIs received by the wireless receiver before the track starts and after the track ends. Next, a score is computed based on a difference between the peak RSSI and the lowest RSSI, and a tentative match is found if the score is above a threshold. In various embodiments, the camera tracks may be used to predict the expected strength of the wireless signal at various times along the camera track, and the score is a calculation indicating a fit of the wireless data to the predicted wireless signal strength. The threshold value may depend on the scoring method utilized and system tuning to achieve a desired level of performance. If multiple tentative matches are found, the match with the highest peak RSSI may be selected consistent with the prediction.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the disclosure and their advantages are best understood by referring to the detailed description that follows. It should be appreciated that like reference numerals are used to identify like elements illustrated in one or more of the figures.

DETAILED DESCRIPTION

Aspects of the present disclosure generally relate to monitoring systems having an image sensor and a wireless sensor, and methods for using the same for monitoring objects identified within in a field of view. In one embodiment, a monitoring system is operable to collect image data from the image sensor and merge the same with wireless data collected from the wireless sensor to categorize the identified objects.

In various aspects of the disclosure, the monitoring system is used for applications such as people counting, queue measurement, full premises tracking, and/or other people counting and tracking applications. The monitoring system provides the capability to identify and track people (or other objects) within the field of view of the image sensor and may then perform a set of track analytics, such as counting, queue length, and time in a given area. In one embodiment, an output of the imaging system comprises data that contains both customer behavior metrics and diagnostic information, and excludes data associated with employees identified by the monitoring system. For many establishments, for example, a system that combines employee traffic with customer/visitor traffic will produce less accurate customer/visitor data, which could skew conversion rates, inflate traffic counts used in labor allocation and devalue people counting. The systems and methods disclosed herein resolve these and other issues with conventional systems.

In one embodiment, a monitoring system utilizes an employee identification system that includes wireless employee tags, such as employee identification tags generating a Bluetooth Low Energy (BLE) signal. Using a people counting camera equipped with a wireless receiver, camera tracks of people activity through a field of view are associated with wireless signals received by the wireless receiver. Experimental results have shown that the methods disclosed herein may be used to separate employee counts from customer counts, thereby offering more accurate customer analytics.

In various embodiments, the monitoring system disclosed herein may be targeted to the retail video analytics market (e.g., counting, queue measurement, etc.), the retail video surveillance market, banking, transportation, premises management, and other markets as will occur to one of ordinary skill in the art.

Figure 1:
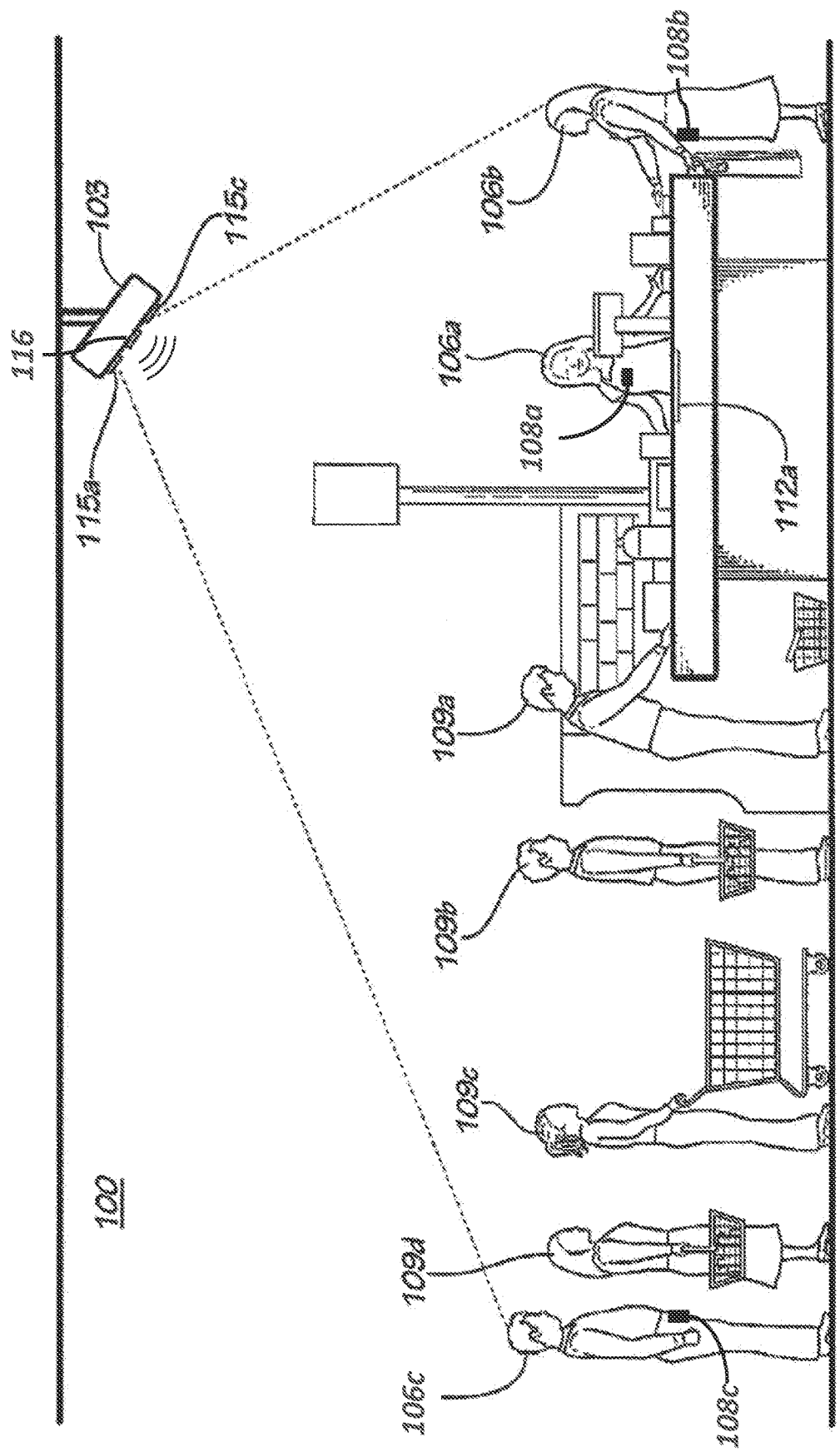
FIG. 1 illustrates an exemplary environment in accordance with various embodiments of the present disclosure.

Referring now to the drawings, FIG. 1 illustrates an exemplary environment 100 in which an embodiment of a monitoring system 103, including its associated methods and functionalities, is utilized in accordance with the various aspects of the present disclosure. The monitoring system 103 includes one or more image sensors, such as image sensor 115a and image sensor 115c, operable to capture images of a field of view of the environment 100. The monitoring system 103 further includes a wireless sensor 116 operable to receive wireless signals from wireless devices, including wireless devices within the field of view. In the illustrated embodiment, the two image sensors 115a and 115c (e.g., cameras) are configured to capture image which may be combine to form three-dimensional (3D) images of the field of view. In other embodiments, the monitoring system 103 may include one or more image sensors configured to capture images to produce a two-dimensional (2D) image of the field of view. In various embodiments, the monitoring system 103 is arranged such that a location in the captured image may be mapped to a physical location in the environment 100.

The wireless sensor is configured to receive a wireless signal generated by one or more wireless devices in accordance with a wireless communications protocol, such as the Bluetooth Low Energy (BLE) protocol. In various embodiments, the wireless communications protocol may include a local or personal wireless communications protocol such as Bluetooth, WiFi and/or RFID. Other wireless communications protocols may be used in accordance with the teachings of the present disclosure. In many aspects, the monitoring system 103 also includes computer processors, memories, software, and other computer-related components for capturing, processing, storing, and transmitting image data captured by the image sensors 115a and 115c and wireless data captured by the wireless sensor 116. Further details and information relating to the hardware specifics of various embodiments of the monitoring system 103 will be described in greater detail in FIG. 2.

As shown in FIG. 1, an embodiment of the monitoring system 103 is utilized in an environment 100, such as an area that includes a point-of-sale transaction terminal in a retail establishment, a banking environment, a transportation center, an entrance/exit to/from a building, location or other premises, or any other localized area in which people or objects may move and/or interact with devices, other people, or objects. In one embodiment, the environment 100 (e.g., encompassing a transaction terminal and customer queue) is controlled by an operator 106a, such as a retail store employee or cashier, and comprises systems for performing the transactions. For example, in a retail store the transactions involve people 109a-d purchasing different items from the retail store, where the purchase is conducted at a transaction register 112a.

In the illustrated embodiment, the monitoring system 103 is positioned to view the selected area of interest in the exemplary environment 100 including the transaction terminal. The monitoring system 103 comprises an image tracking system (e.g., image sensors 115a and 115c, image processing software, object tracking software) configured to detect and track at least one object, such the individuals 106a-c and 109a-d, within the field of view, and the wireless tracking system 116 is configured to detect and track at least one wireless object, such as employee badges 108a-c. The monitoring system 103 may perform additional data processing with the data acquired by the image sensors 115a and 115c and wireless sensor 116, and the data may also be transmitted to any other system or systems, such as a control unit, server, storage device, for further processing.

In one embodiment, the imaging sensors 115a and 115c are monochromatic sensors and at least one high resolution color sensor is also provided. In one aspect, the image sensors 115a and 115c can have different fields of view, and the sensors may acquire data, images, or video frames from different regions within the environment 100 where the monitoring system 103 is deployed. For example, the two sensors 115a, 115c can have a wide field of view covering the entire environment 100, and another sensor, such as a high pixel resolution color sensor, may have a narrower field of view to track specific objects 106, 109 or details at the transaction terminal. In various other embodiments of the monitoring system 103, other arrangements of components may be employed. For example, certain embodiments of the monitoring system 103 may utilize any number of additional sensors to capture the desired images and information from the environment 100. In other embodiments, a plurality of sensors can be used, such as thermal sensors to track the temperature of objects within the environment 100. It will be understood by those of ordinary skill in the art that many variations of the monitoring system 103 are possible in light of the present disclosure, and no limitation is intended by the specific embodiments presented.

Additionally, according to various embodiments, the image data, associated image and object metadata and wireless data is merged to create one cohesive data set. For example, the image sensors 115a, 115c can be used to identify and track objects within the environment 100. The object tracking data can be merged to generate a comprehensive 3D data picture of the objects in any given frame captured by the sensors 115a and 115c. The data can also be merged with the wireless data to assist in the classification of people as employees or customers.

Figure 2:
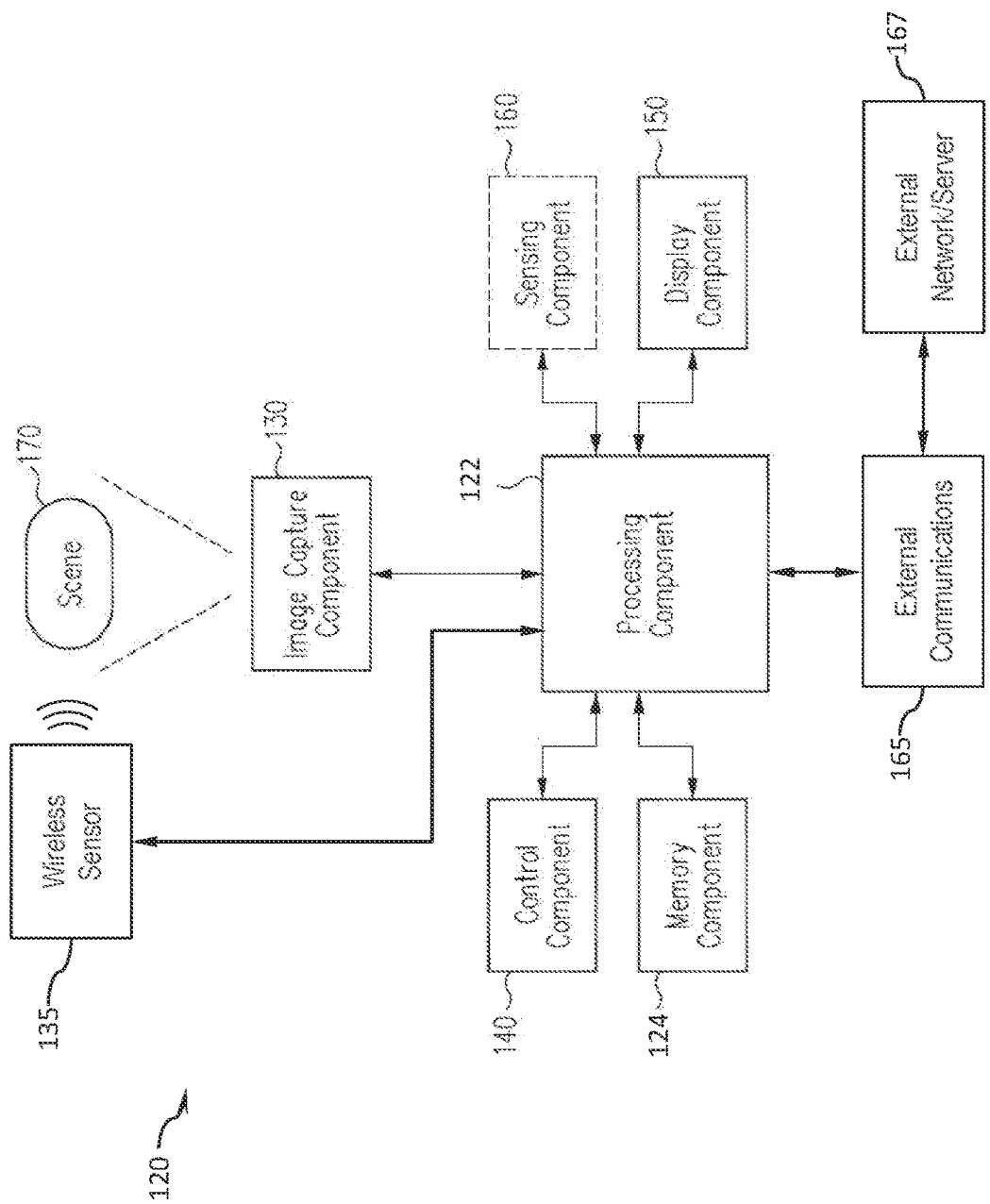
FIG. 2 is a schematic view of electrical hardware of an exemplary imaging system in accordance with various embodiments of the present disclosure.

Turning now to FIG. 2, an exemplary monitoring system will be described in accordance with various embodiments of the disclosure. FIG. 2 illustrates a block diagram of a monitoring system 120 for capturing and processing images in accordance with one or more embodiments. Monitoring system 120 comprises, in one implementation, a processing component 122, a memory component 124, an image capture component 130, a wireless sensor component 135, a control component 140, and/or a display component 150. Monitoring system 120 may further include an additional sensing component 160 and external communications components 165, providing communications with one or more external networks or servers 167.

In various embodiments, monitoring system 120 may represent, for example, an imaging system such as a visible light imaging device (e.g., a video camera), an infrared imaging device, or a multi-band imaging device for capturing and processing images, such as video images of a scene 170. In some embodiments, monitoring system 120 may represent an infrared camera adapted to detect infrared radiation and provide representative data and information (e.g., infrared image data of a scene) or may represent more generally any type of electro-optical sensor system. Monitoring system 120 may comprise a portable device, a non-mobile installation and/or a distributed networked system.

In various embodiments, processing component 122 may comprise any type of a processor or a logic device (e.g., a programmable logic device (PLD) configured to perform processing functions). Processing component 122 may be adapted to interface and communicate with components 124, 130, 135, 140, 150, 160 and 165 to perform method and processing steps and/or operations, as described herein such as controlling biasing and other functions along with conventional system processing functions as would be understood by one skilled in the art.

Memory component 124 comprises, in one embodiment, one or more memory devices adapted to store data and information, including for example image data, wireless data and object identification and tracking information. Memory component 124 may comprise one or more various types of memory devices including volatile and non-volatile memory devices. In one aspect, the memory component 124 comprises a random access memory (RAM), a read-only memory (ROM), component electronically programmable read-only memory (EPROM), erasable electronically programmable read-only memory (EEPROM), other flash memory, Secure Digital (SD) Card, as well as other suitable forms of memory. The functions of the monitoring system 120 may be implemented through dedicated hardware and circuitry and software programs that may be installed into the memory component 124 of the monitoring system 120. The monitoring system 120 generally includes several software programs or modules, each comprising a plurality of executable instructions which, when stored in the memory component 124, cause the processing component 122 to perform the processes shown and described hereinafter.

In various embodiments, the processing component 122 comprises an embedded microprocessor for data processing as well as controlling the operation of the monitoring system 103. Generally, the embedded microprocessor comprises a plurality of digital and analog ports for interfacing with the different components of the monitoring system 120. In one aspect, the microprocessor controls the image capture component 130 and wireless sensor component 135, commands the sensors to capture data, processes the data, and provides an output in accordance with various aspects in the present disclosure. In one aspect, the embedded microprocessor comprises a system-on-chip as well as a digital signal processing (DSP) architecture, peripherals for interfacing with the different components in the monitoring system 120, peripherals for networking, booting and encryption, and may run an operating system.

The monitoring system 120 may be programed via external communications components 165 to perform various aspects of the present disclosure, and any resulting software programs are generally stored in the memory component 124. In one aspect, the microprocessor commands the image and wireless sensors to acquire data from an associated area, processes the data from the different sensors, and outputs analytical results according to the various embodiments of the present disclosure. The monitoring system 120 may also comprise ports of power delivery, programing, data transfer, networking and any other component as required by the processes described by the various embodiments of the present disclosure.

Image capture component 130 comprises, in one embodiment, any type of image sensor, such as, for example, an image sensor having one or more image detector elements such as visible light photodetector elements or infrared photodetector elements for capturing infrared image data (e.g., still image data and/or video data) representative of an scene such as scene 170. In one aspect, one or more sensors may be housed in separate sections in the monitoring system 120, and interfaced with the rest of the monitoring system 120 via internal connections, such as digital or analog busses or connectors. In one aspect, the sections in the monitoring system 120 may comprise the supporting structure and components required to enable normal operation of the imaging sensors.

In one embodiment, image capture component 130 may be configured to generate digital image data representing incoming image light from scene 170. Image capture component 130 may include one or more signal processing components such as analog-to-digital converters included as part of an image sensor or separate from the image sensor as part of monitoring system 120. In one aspect, image data (e.g., video data) may comprise non-uniform data (e.g., real image data) of a scene such as scene 170. Processing component 122 may be adapted to process the image data (e.g., to provide processed image data), store the image data in memory component 124, and/or retrieve stored image data from memory component 124. For example, processing component 122 may be adapted to process image data stored in memory component 124 to provide processed image data and information (e.g., captured and/or processed image data).

Control component 140 comprises, in one embodiment, a user input and/or interface device. For example, the user input and/or interface device may represent a rotatable knob (e.g., potentiometer), push buttons, slide bar, keyboard, etc., that is adapted to generate a user input control signal. Processing component 122 may be adapted to sense control input signals from a user via control component 140 and respond to any sensed control input signals received therefrom. Processing component 122 may be adapted to interpret such a control input signal as a parameter value, as generally understood by one skilled in the art. In one embodiment, control component 140 may comprise a separate control unit (e.g., a wired or wireless unit) having push buttons adapted to interface with a user and receive user input control values. In one implementation, the push buttons of the control unit may be used to control various functions of the monitoring system 120, such as autofocus, menu enable and selection, field of view, brightness, contrast, noise filtering, high pass filtering, low pass filtering, and/or various other features as understood by one skilled in the art.

The monitoring system 120 may include an optional display component 150 which comprises, in one embodiment, an image display device (e.g., a liquid crystal display (LCD) or various other types of generally known video displays or monitors). Processing component 122 may be adapted to display image data and information on the display component 150. Processing component 122 may be adapted to retrieve image data and information from memory component 124 and display retrieved image data and information on display component 150. Display component 150 may comprise display electronics, which may be utilized by processing component 122 to display image data and information (e.g., infrared images). Display component 150 may be adapted to receive image data and information directly from image capture component 130 via the processing component 122, or the image data and information may be transferred from memory component 124 via processing component 122. In some embodiments, display components may be provided through other user devices (e.g., a mobile device or desktop computer) that access processed data via a network or server system.

Optional sensing component 160 comprises, in one embodiment, one or more additional sensors of various types, depending on the application or implementation requirements of the monitoring system 103, as would be understood by one skilled in the art. The sensors of optional sensing component 160 provide data and/or information to at least processing component 122. In one aspect, processing component 122 may be adapted to communicate with sensing component 160 (e.g., by receiving sensor information from sensing component 160) and with image capture component 130 (e.g., by receiving data and information from image capture component 130 and providing and/or receiving command, control, and/or other information to and/or from one or more other components of monitoring system 120).

In various implementations, optional sensing component 160 may provide additional information regarding environmental conditions, such as temperature, lighting conditions (e.g., day, night, dusk, and/or dawn), humidity level, specific weather conditions (e.g., sun, rain, and/or snow), and/or distance (e.g., laser rangefinder). Sensing component 160 may represent conventional sensors as generally known by one skilled in the art for monitoring various conditions (e.g., environmental conditions) that may have an effect (e.g., on the image appearance) on the data provided by image capture component 130. In some implementations, optional sensing component 160 (e.g., one or more of sensors) may comprise devices that relay information to processing component 122 via wired and/or wireless communication. For example, optional sensing component 160 may be adapted to receive information from a satellite, through a local broadcast (e.g., radio frequency (RF)) transmission, through a mobile or cellular network and/or through information beacons in an infrastructure (e.g., a transportation or highway information beacon infrastructure), or various other wired and/or wireless techniques.

In various embodiments, components of monitoring system 120 may be combined and/or implemented, as desired or depending on the application or requirements, with monitoring system 120 representing various functional blocks of a related system. In one example, processing component 122 may be combined with memory component 124, image capture component 130, display component 150, and/or optional sensing component 160. In another example, processing component 122 may be combined with image capture component 130 with only certain functions of processing component 122 performed by circuitry (e.g., a processor, a microprocessor, a logic device, a microcontroller, etc.) within image capture component 130. Furthermore, various components of monitoring system 120 may be remote from each other (e.g., image capture component 130 may comprise a remote sensor with processing component 122, etc. representing a computer that may or may not be in communication with image capture component 130).

In various embodiments, the monitoring system 120 may be implemented as a people counting and analytics system.

In one embodiment, the image capture component 130 includes at least one image sensor for capturing a 2D image of the scene 170. In other embodiments, the image capture component includes at least two image sensors for capturing a 3D image of the scene 170. Generally, the image sensors are distally separated from one another and capture two-dimensional images, which are combined and processed in the device by the processing component 122 to acquire various characteristics of objects in a selected area of interest or tracking area. In one aspect, the monitoring system 120 further comprises a high resolution color sensor for capturing high quality color images of the scene 170, which may be merged with the data from the other image sensors to form a data set of all image data captured from all image sensors. The monitoring system 120 may further include external communications components 165 for communicating with one or more networks, computers, mobile devices, other monitoring systems, servers or other devices 167 as may be used to support the processing involved in the various aspects of the present disclosure.

External communication components 165 can include a variety of suitable input/output connection interfaces, such as wired connections, standard serial ports, parallel ports, S-video ports, large area network (LAN) ports, small computer system interface (SCSI) ports, or other suitable wired connections. Additionally, the external communication components 165 can include, for example, wireless connections, such as infrared ports, optical ports, Bluetooth wireless ports, wireless LAN ports, ultra-wide band (UWB) wireless ports, among others as will occur to one of ordinary skill in the art.

As will be understood by one of ordinary skill in the art, the hardware and specific circuitry of embodiments of the monitoring system 120 can vary according to aspects of the present disclosure. Accordingly, although examples of the hardware associated with the monitoring system 120 have been previously described, it is not intended that the present disclosure be limited to the specific embodiments or aspects presented, and other variations of the monitoring system 120 will be apparent to one of ordinary skill in the art.

Figure 3:
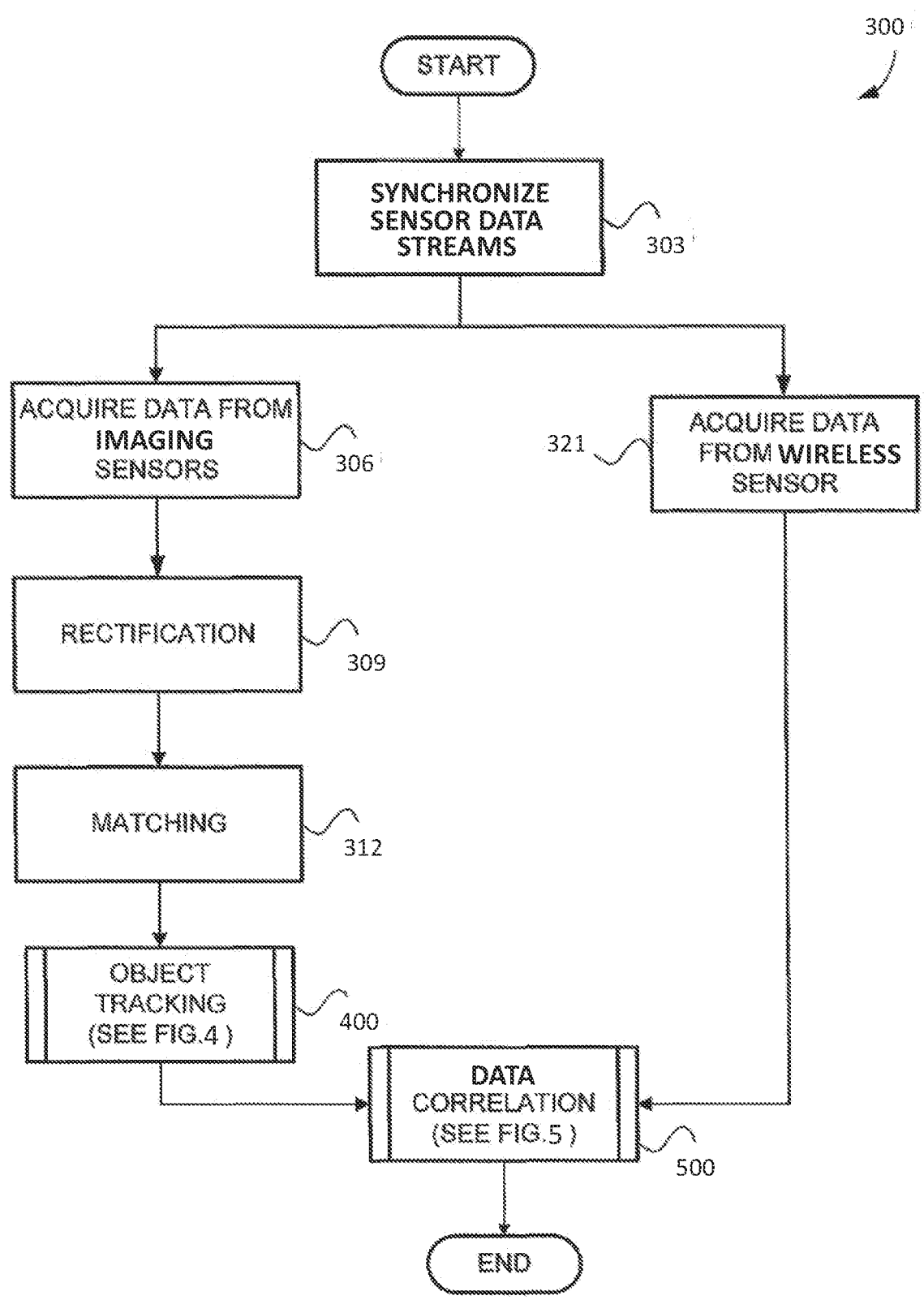
FIG. 3 illustrates an exemplary data merging process for merging captured data streams in accordance with various embodiments of the present disclosure.

Turning now to the processes, methods, and other functionalities performed by the software, modules, algorithms, and other components of the present disclosure, FIG. 3 illustrates an exemplary data merging process 300 for merging multiple data streams according various embodiments of the present disclosure. In the embodiment of FIG. 3, an exemplary process is shown for merging data outputs/streams from a pair of stereo image sensors and a wireless sensor. As will be understood, the steps of the process 300 shown in FIG. 3 (and other processes shown and described in this disclosure) are not necessarily completed in the order shown, and various processes of embodiments of the present disclosure may operate concurrently and continuously. Accordingly, the steps shown in FIG. 3 (and in other figures, such as FIG. 4 and FIG. 5) are generally asynchronous and independent, computer-implemented, tied to particular machines, and not necessarily performed in the order shown.

In one embodiment, the monitoring system 103 generally synchronizes, via step 303, the sensor data streams from the imaging sensors (e.g., image sensors 115a and 115c of FIG. 1) and wireless sensors (e.g., wireless sensor 116), which may include synchronizing the timing and temporal resolution of data that may be acquired from each sensor. In the illustrated embodiment, the monitoring system 103 utilizes a single controller or microprocessor enabling common control and management of the various sensors.

After the synchronization of the data streams, the monitoring system 103 acquires or receives data (e.g., one or more image frames), at step 306, from the image sensors, and also receives wireless data (e.g., one or more wireless data samples), at step 321, from wireless sensor 116. In one embodiment, the receipt or acquisition of data from the image sensors and wireless sensor is continuous and running in parallel. In other embodiments, data may be received or acquired based on the triggering of an event. For example, if an object is identified in the image data (e.g., via object tracking process 400), then an event can be triggered such that the wireless sensor will begin capturing data and providing it to the processing components 122 via step 321. Further, in one embodiment, because the images, data, frames and samples being acquired from the sensors are temporally synchronized, each time-delimited collection of frames and wireless data samples may include varying numbers of data elements. For example, the image sensors may run at a different frame rate than the wireless data sample rate.

After the images from the sensors have been acquired at step 306, rectification (step 309) and matching (step 312) of the data captured by the image sensors is performed. During rectification, the monitoring system 103 computes the relationship between the image frames captured by different image sensors. The rectification step 309 may utilize known calibration parameters of the image sensors and compute the transformations of the images captured by the image sensors as a means to position the images on the same plane. These rectification steps generally attempts to solve the correspondence problem, which refers to the problem of ascertaining which parts or fields of one image captured by one image sensor correspond to similar parts or fields of the image captured by the other image sensor. In embodiments with a single image sensor or 2D image representation, the rectification and matching steps are not performed.

After the images or data captured by the image sensors has been rectified at step 309, the matching step 312 is performed. The matching process generally comprises generating or calculating a disparity map, which refers to the difference in image location of an object identified and captured by the image sensors and resulting from the physical distal separation of the image sensors. The monitoring system 103 generally uses the disparity map to extract depth information from captured two-dimensional images. For example, the difference in coordinates of similar features within two images captured by two image sensors (such as image sensor 115a and 115c of FIG. 1) may be generally calculated by the monitoring system 103 of the present disclosure. Generating a disparity map for two images is generally known in the art. For example, calculating the disparity map and rectifying the images are demonstrated in camera calibration and 3D reconstruction functions in OpenCV.

In various embodiments, the output of the matching step may be a left rectified image (from the left image sensor), a right rectified image (from the right image sensor), and a disparity map. In one aspect, after the matching step 312 has been performed, methods for identifying and tracking at least one object, such as a person, in a video frame comprising the merged image data are performed by the monitoring system 103 via object tracking process 400. Generally, the outcome of the object tracking process 400 is a collection of metadata relating to the images and objects identified in those images, including data representing the change in the physical location of the identified objects over time.

Aspects of the monitoring system 103 are programmable and customizable, and a variety of identification and tracking methods can be utilized by the system of the present disclosure. Further, in one aspect, metadata about the characteristics and behavior of the objects that have been identified and tracked in a particular area of interest are extracted (via the object tracking process 400). Then, the monitoring system 103 acquires wireless data, at step 321, from the wireless sensor 116 and correlates and processes the wireless data with the metadata about the objects being identified and tracked in the particular area of interest (e.g., via data correlation process 500). In this manner, the metadata associated with time-delimited images can be associated with corresponding wireless data (captured at step 321).

In one embodiment, wireless data is collected from wireless employee tags which include embedded accelerometers that can provide motion data, such as acceleration and velocity, to the monitoring system. Such accelerometer data may enable the monitoring system to determine whether a tag is moving and its approximate speed, which further improves the accuracy of matching wireless signals with camera tracks. For example, the object tracks from captured images may be analyzed to extract feature characteristics associated with object motion at various times along the object track. The extracted feature characteristics may then be compared to accelerometer data at the same approximate time to match an employee tag with a detected person.

Figure 4:
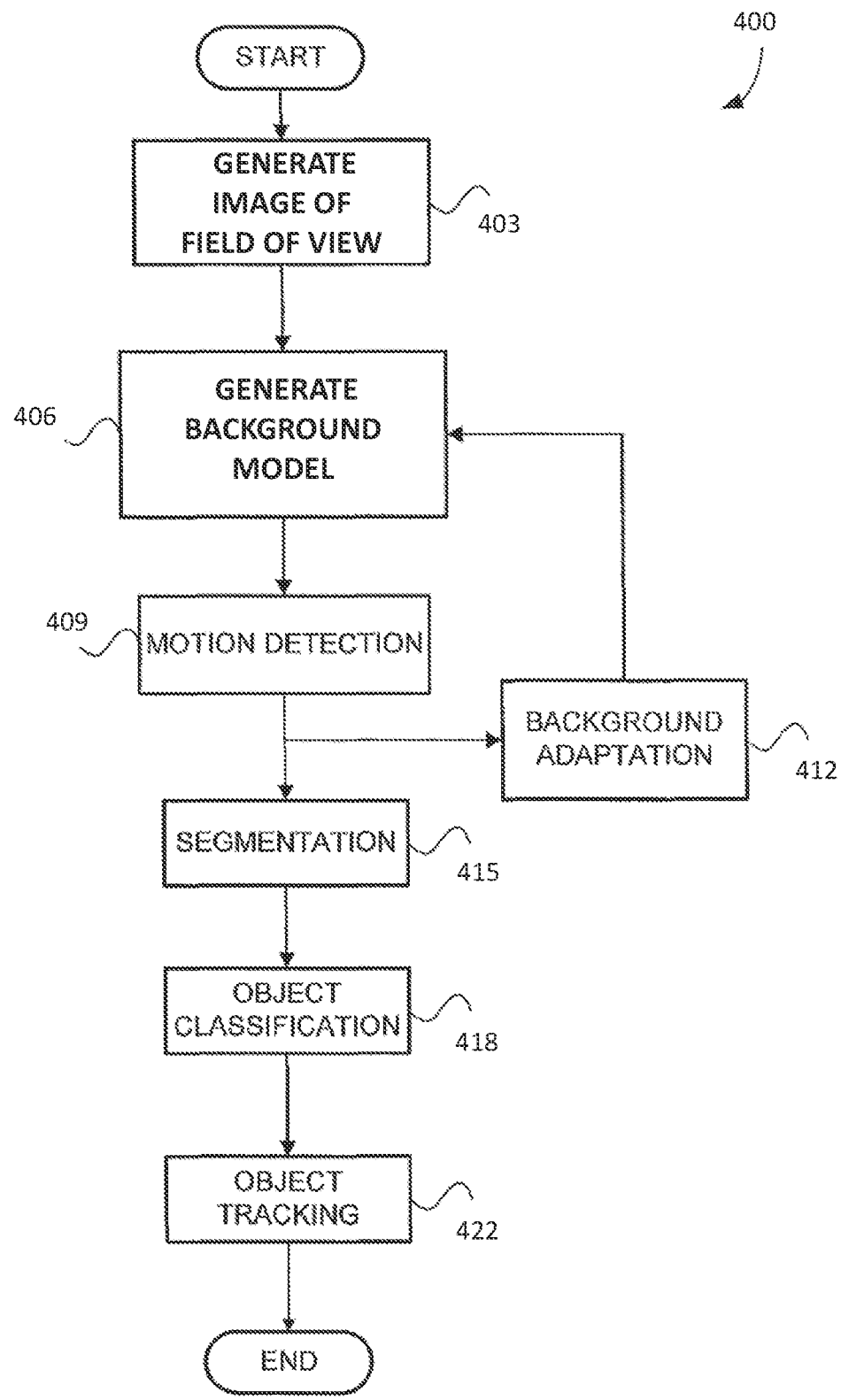
FIG. 4 illustrates an exemplary object tracking process performed in accordance with various embodiments of the present disclosure.

Further details of the object tracking process 400 and data correlation process 500 will be described in greater detail below. FIG. 4 illustrates an exemplary embodiment of an object tracking process 400 performed by the monitoring system 103 of the present disclosure. Generally, the monitoring system 103, at step 403, generates an image of an area of interest, and also generates (via step 406) a background model of an area of interest. In one embodiment, the generated image is a 3D stereo image and the background model is a 3D background model generally comprising data created by rectifying and matching the data captured by two or more image sensors. The background model represents the features in an area of interest (i.e., a stationary portion of the image) that are generally not objects to be tracked. In some embodiments, the monitoring system 103 may also generate a greyscale image (via step 403) and a greyscale background model (via step 406) for additional use during the object tracking process 400.

In various embodiments, the monitoring system 103 uses the differences between the background model and a received image to identify potential objects to be tracked in an area of interest. For example, people moving through a scene tend to have different attributes than the background. These differences between the background model and the received image can be used to identify and track the motion of a potential object (step 409). Further, in various embodiments methods for motion detection and tracking generally rely on finding similarities and differences among contiguous image frames captured by image sensors.

Over time, the region of interest or scene that is being viewed by the monitoring system 103 can change. These changes may result from changes in lighting conditions or changes in the physical location of objects within the system view, etc. In order to accurately detect objects within the view of the monitoring system 103, the system may be capable of adapting its background to incorporate changes in the scene or area of interest. In a queue at a retail store, for example, the background should generally be updated over time to reflect scene changes in the real world, which may result from lighting condition changes, adding or removing of background objects, physical changes in the background environment, etc. Therefore, reliable object identification and tracking generally includes background adaptation (step 412), which comprises updating the background model(s) in the system with changes to the background of an area of interest. The background adaptation generally utilizes the results of the motion detection step (409) and updates the background model accordingly. Thus, the newly updated background model is then used to perform subsequent motion detection (step 409).

In one aspect, after the motion detection step has been performed, the monitoring system 103 performs a segmentation step (via step 415) for extracting image information from an image or video frame for regions of an image or video frame likely to represent objects of interest in a scene, such as objects to be tracked. In one aspect, after the segmentation process 415, an object classification process 418 is performed. Generally, the output of the segmentation process 415 is a set of regions likely to represent objects to be tracked, such as a person in a people counting system, or other objects that may be relevant to the system, such as an item being purchased by a person. In one aspect, the object classification process 418 examines image information from regions, such as the regions formed during the segmentation process 415, and determines which regions have a high likelihood of including or comprising an object to be tracked, such as a person. As will be understood and appreciated, the motion detection step 409, background adaptation step 412, segmentation step 415 and object classification step 418 may be accomplished using a variety of methods, and the monitoring system 103 of the present disclosure is fully configurable to accommodate and implement various methods as will occur to one of ordinary skill in the art.

Still referring to FIG. 4, after the object classification step 418 is complete, object tracking 422 is performed for identified people or other objects to be tracked by the system. In various embodiments, the real-world location of an object can be generally calculated from the image data, sensor configuration and known environmental parameters, and the location data may be stored with an object identifier, timestamp and other object metadata as an object track. The movement of objects, referred to as tracks, through the scene or area of interest over time is constructed based upon the correspondence determined between the regions of interest that represent objects in consecutive images or video frames. The movement of objects, such as people, can be tracked through a scene or area of interest because the real-world location at a given instant of time can by calculated by the monitoring system 103.

In one aspect, the monitoring system 103 assigns a unique object ID to each object identified, and also leverages methods known to one of ordinary skill in the art to identify and calculate metadata relating to the object, such as a timestamp, the location in real-world space of the object (e.g., coordinates x,y from an overhead view), location in the image space (left rectified image, right rectified image, high resolution rectified image), the real-world height, width, size, mass, velocity, acceleration, trajectory, movement, etc. Generally, this metadata relates to the physical features of an object, but may also relate to other non-physical features, such as the time of capture of the image, a premises location identified for an image, etc. Further, the metadata may include time-based or persistence-based metadata, such as the persistence time of an object within an image, the exit or entry time of an object within an image, etc.

Figure 5:
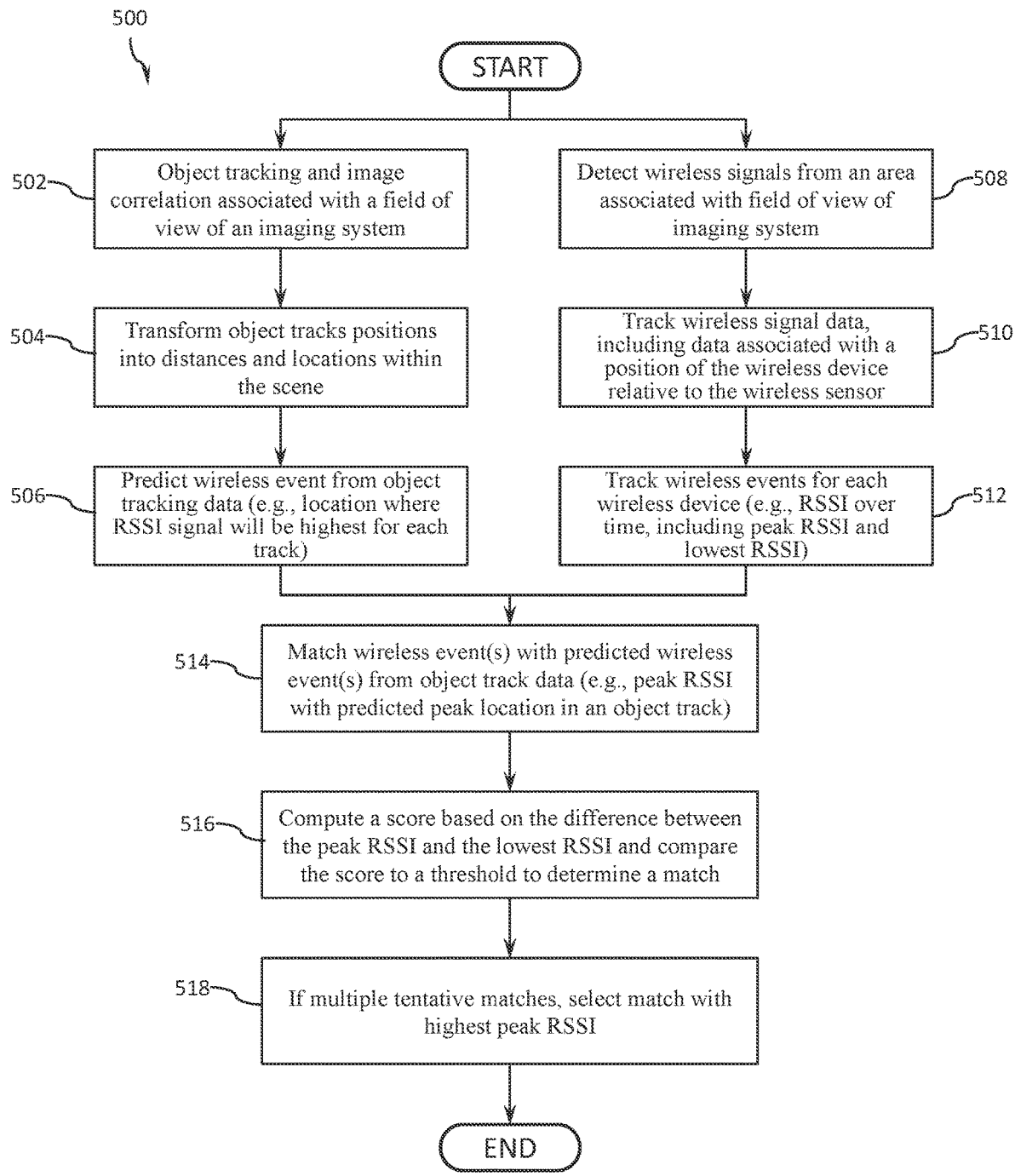
FIG. 5 illustrates an object tracking and data correlation process performed in accordance with various embodiments of the disclosure.

Referring now to FIG. 5, an exemplary data correlation process 500 is shown according to various embodiments of the present disclosure. Generally, aspects of the data correlation process 500 involve processing of previously-acquired images and wireless data and associating the data corresponding to identified object (e.g., people) with identified wireless devices. In one embodiment, the correlated data enables downstream analysis, searching, indexing, and the like. For example, the correlated data may distinguish between a customer/visitor and an employee, and the downstream analysis may be limited to identified customer/visitor objects for further analytics.

At step 502, object tracking data, including object metadata such as physical location and a tracked path, associated with a particular field of view is received. The location information from the object tracking data is converted into distances from the monitoring system at step 504, which may include locations associated with an entrance into the field of view, an exit from the field of view, a closest location along the tracked path to the monitoring system and a farthest location in the tracked path from the monitoring system. At step 506, the object tracking data is analyzed to determine one or more positions in time where an associated wireless signal generated from the object will have certain characteristics. In one embodiment, the object tracking data is analyzed to determine a location and time at which a wireless signal generated from a wireless device associated with the object would be expected to have a strongest wireless signal strength (e.g., at a location along the track closest to the monitoring system) and a location and time at which an associated wireless signal would be predicted to have a weaker wireless signal strength (e.g., at a location away from the monitoring system such as an entrance to or exit from the field of view).

Contemporaneous with steps 502-506, the wireless signals detected during a corresponding time period are received in step 508. In step 510, the wireless devices are identified (e.g., by wireless identifier) and tracked over time in step 510 to produce a set of wireless signal data associated with each wireless device, which may include signal strength of the wireless signal received at periodic sample periods and/or other information such as time of flight data indicating a distance from the monitoring system. In step 512, predicted wireless events are analyzed, such as received signal strength indicator (RSSI) level, including a peak RSSI and a lowest tracked RSSI various times.

In step 514, tracked wireless events are matched against predicted events from the object metadata. For example, a tracked wireless device will have an associated peak wireless signal strength during the wireless device tracking. The wireless device is then matched up with an object having a predicted peak signal strength (e.g., closest position to the monitoring system from object tracking data) at a corresponding time period. In step 516, a score is computed based on how well the wireless data matches the predicted wireless signal properties. For example, the difference between the peak RSSI and the lowest RSSI may be used to generate a score and the score is compared to a predetermined threshold to determine whether the associated wireless device is associated with the object. In step 518, if multiple matches are detected, the match with the highest peak RSSI is selected as a match to the object data. In one implementation, the wireless device is a wireless employee identification tag and a match between a wireless employee identification tag and a tracked person indicates that the tracked person is likely to be an employee.

Figure 6:
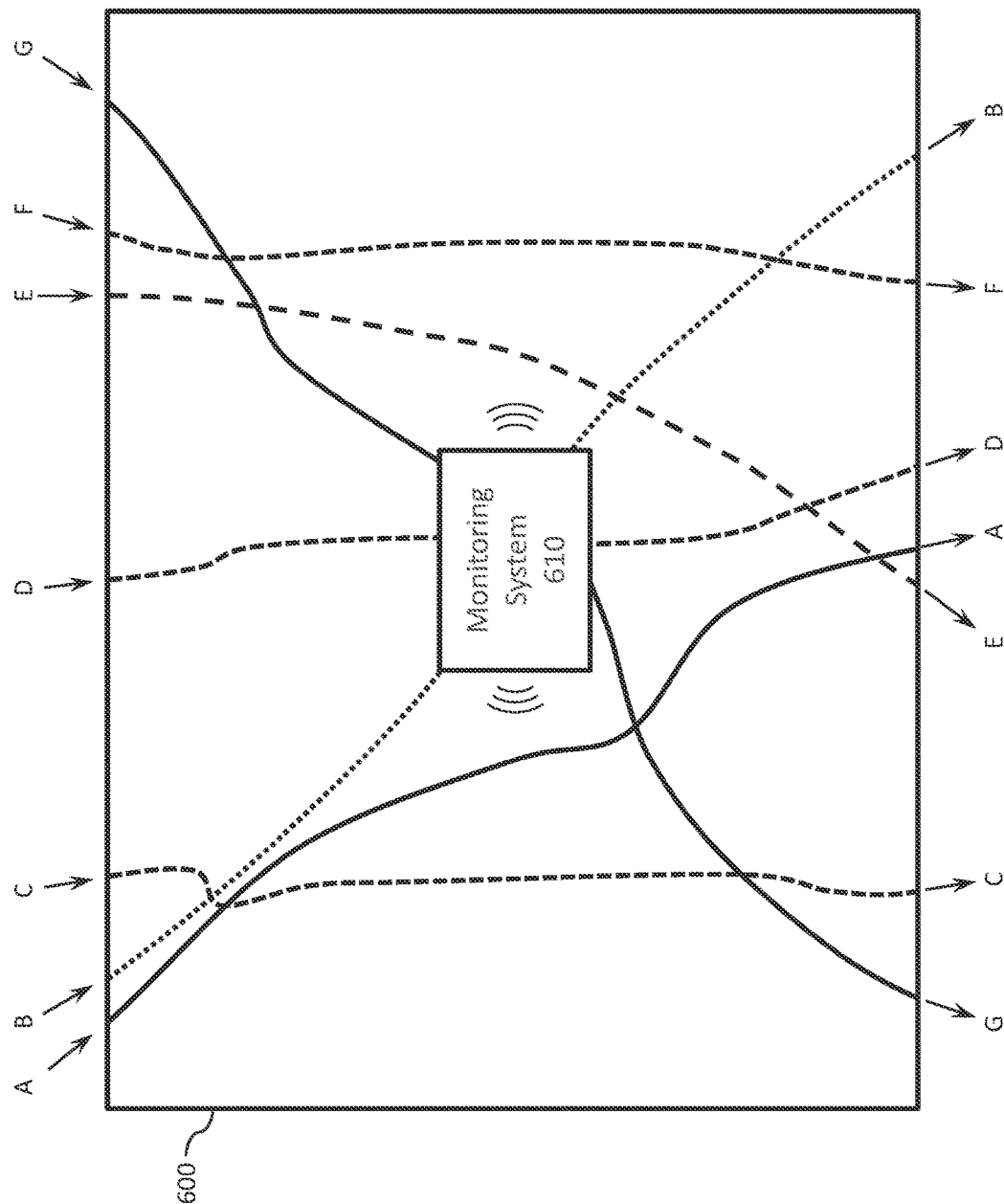
FIG. 6 illustrates exemplary object tracks in accordance with various embodiments of the present disclosure.
Figure 7:
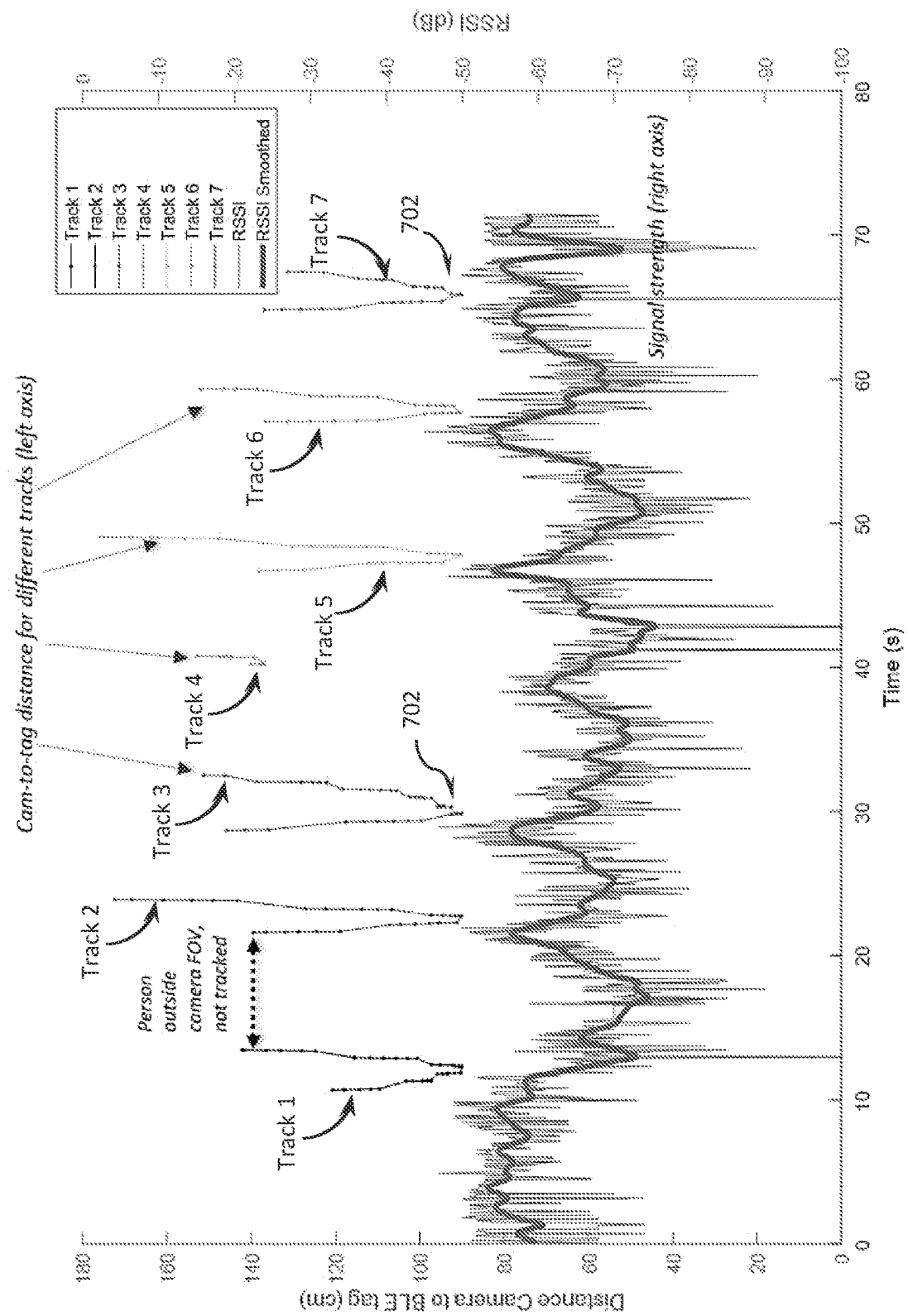
FIG. 7 illustrates exemplary object tracking and wireless signal correlation in accordance with various embodiments of the present disclosure.

Referring to FIG. 6, an example of object tracks through a 2D image space is illustrated. As illustrated, a people counting camera or monitoring system 610 detects and tracks people and obtains multiple camera tracks over time. As the camera calibration information is known (e.g., the image location to a real world location), the camera tracks can be transformed into camera-to-tag distances, as shown in FIG. 7, which also shows a correlation with the BLE RSSI signal strength, in accordance with one embodiment. As illustrated in FIG. 6, tracks A-G pass through a field of view 600 of the monitoring system 610. Objects (e.g., people) are detected and tracked through the field of view 600 with each successive image captured from the image sensors of the monitoring system 610. The object tracks A-G are associated with real world locations that may be calculated from the image data and an estimated distance from each the object to the monitoring system at a given time along its track is measured. At the same time, the monitoring system 610 receives wireless signals from wireless devices that are within the field of view 600 and tracks wireless signal data, such as RSSI strength, of each wireless device. For example, if an employee passing through the field of view 600 (e.g., along track A) is wearing a wireless employee tag detected by the wireless sensor, then certain wireless data (e.g., received signal strength) tracked by the wireless sensor components may change in manner that may be predicted based on the location of the employee along the track. In this manner, the predicted wireless characteristic may be correlated to the object track data, thereby identifying the detected object as an employee when the predicted wireless data sufficiently matched the tracked wireless data.

Referring to FIG. 7, an example correlation of wireless signal strength data and tracked object distance is illustrated. In various embodiments, an employee wearing a wireless identification tag (e.g., a BLE tag) can be identified and excluded from customer analytics by matching the wireless tag with a person tracked by a people counting imaging system. In one embodiment, a method of operation includes transforming camera track positions into camera-to-tag distances as illustrated, and predicting the time when certain wireless events will occur (e.g., when a RSSI signal strength will be the highest for each track). For example, peak RSSI signal strength would be expected to be received when the cam-to-tag distance for a track is at a time 702 that is closest to the monitoring system. For each tracked wireless device, the monitoring system finds the peak received signal strength indicator (RSSI) received by the wireless receiver around a predicted peak time 702 determined for a camera track. The system may also find the lowest RSSIs received by the wireless receiver before the track starts and after the track ends. Next, a score is computed based on a difference between the peak RSSI and the lowest RSSI, and a tentative match is found if the score is above a threshold. In various embodiments, the camera tracks may be used to predict the expected strength of the wireless signal at various times along the camera track, and the score is a calculation indicating a fit of the wireless data to the predicted wireless signal strength. The threshold value may depend on the scoring method utilized and system adjustments to achieve a desired level of performance. If multiple tentative matches are found, the match with the highest peak RSSI may be selected consistent with the prediction.

Figure 8:
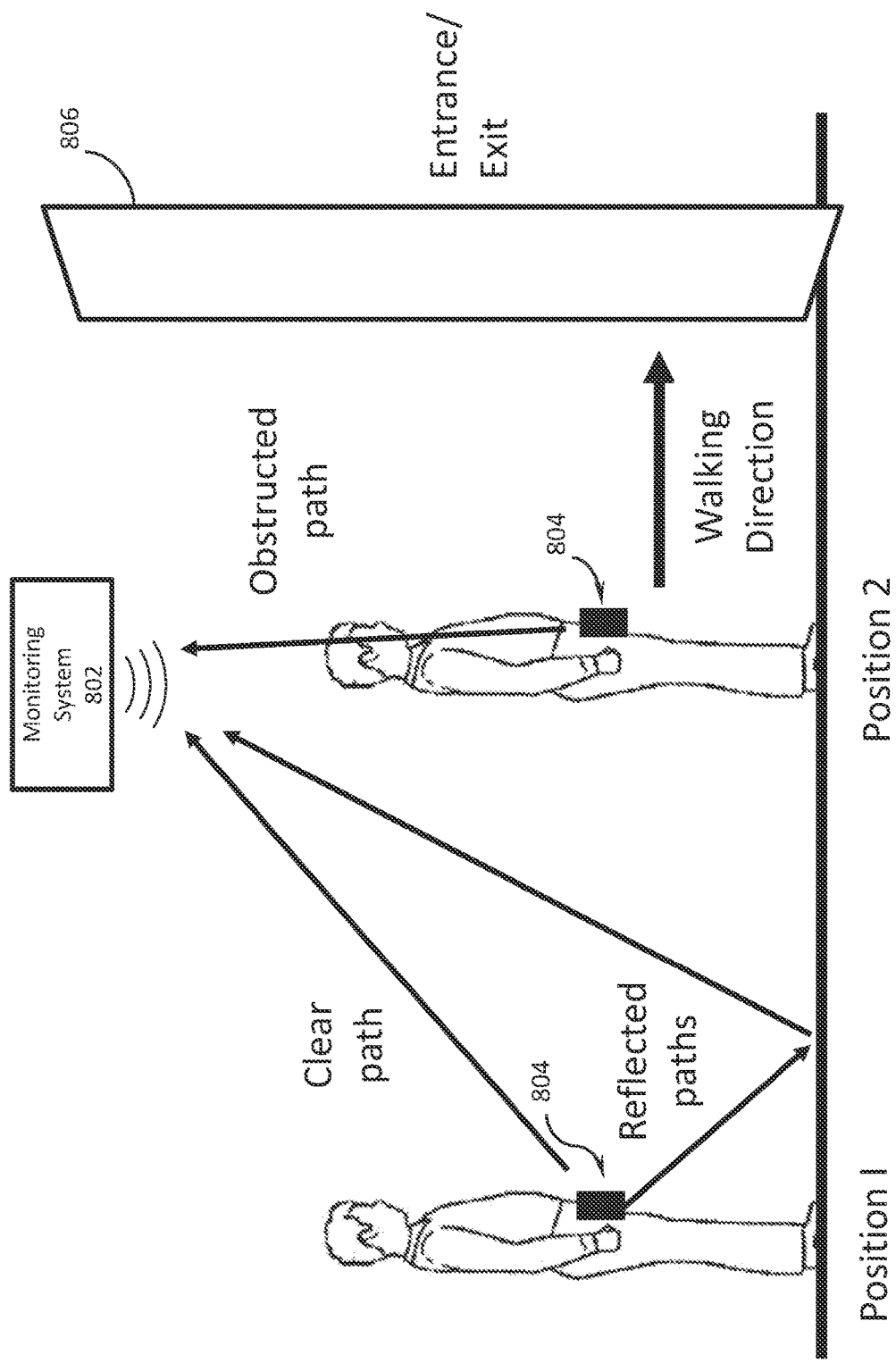
FIG. 8 illustrates exemplary wireless tracking in accordance with various embodiments of the present disclosure.

Referring to FIG. 8, an example of wireless tag reception and positioning is illustrated. At various times, a wireless device may have clear path to the monitoring system 802, a reflected path to the monitoring system 802, or an obstructed path to the monitoring system 802. The location of the wireless tag 804 may be used to predict when a wireless event will occur (e.g., when the wireless tag will produce the strongest signal received by the monitoring system 802). In one embodiment, if the tag is on the shoulder of the employee the wireless tag may be at the closest point to the camera when the person is directly under the camera (such as in Position 2). However, if the tag is placed in or around a front or back pocket, the person may obstruct the wireless signal path when the person is directly under the monitoring system 802. As illustrated in FIG. 8, if the tag is carried in the front pocket, there is a clear line-of-sight at Position 1 before the person passes under the camera, and therefore, the peak RSSI signal is predicted to be detected slightly before the minimum camera-to-tag distance, such as shown in FIG. 7. Similarly, if the tag is carried in the back pocket, the peak RSSI signal may be observed after the person passes under the camera. If the tag is carried on the shoulder, the peak RSSI signal may be observed when the person passes under the camera. Information about how the wireless tag is carried reduces the search range for the peak RSSI signal and improves the matching accuracy. In the illustrated embodiment, one or more monitoring systems 802 are located in proximity to an entrance and/or exit 806 of an establishment (e.g., a stadium, bank, office building or retail establishment) to track people traffic entering or leaving the establishment.

Figure 9:
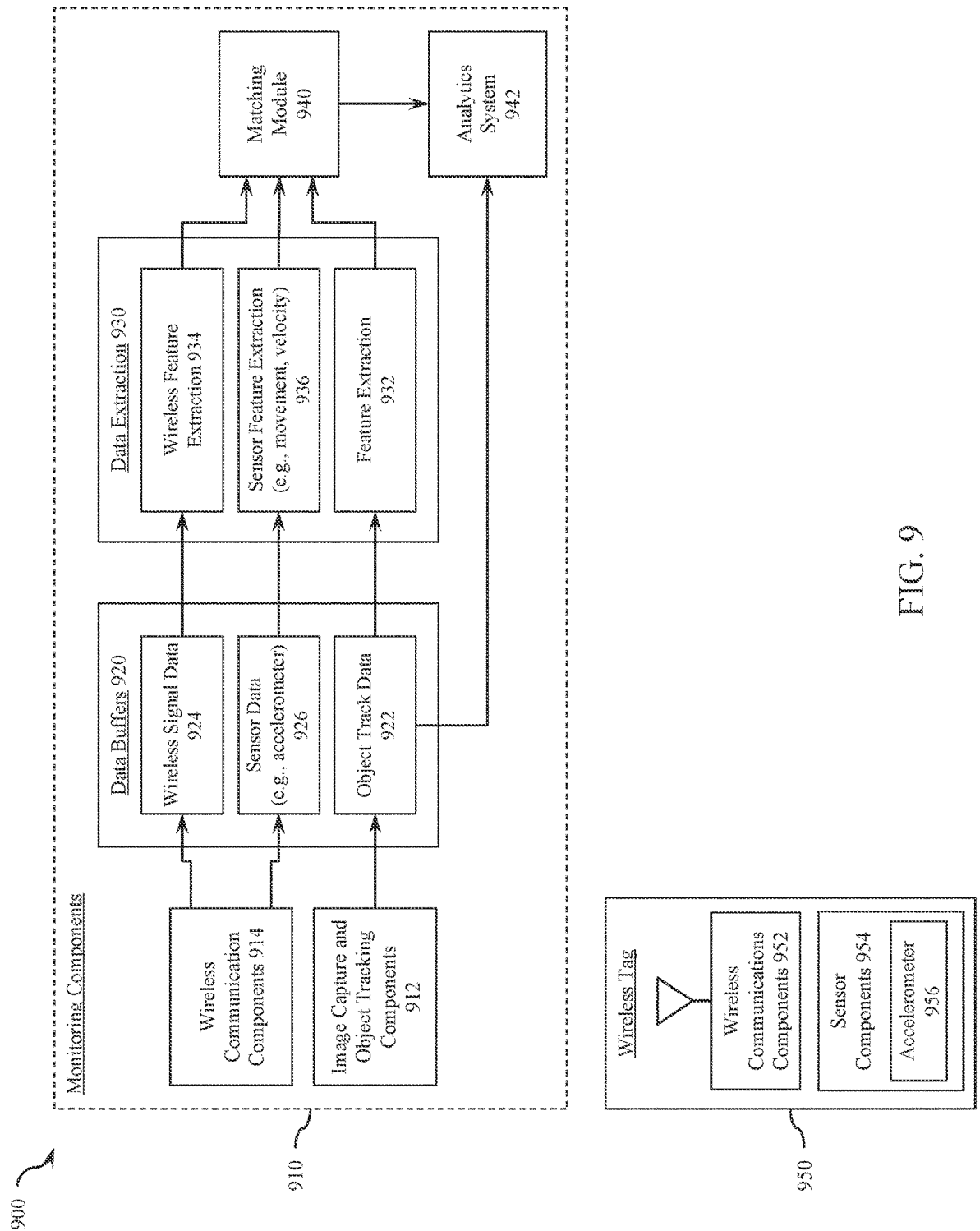
FIG. 9 illustrates a monitoring system in accordance with various embodiments of the present disclosure.

Referring to FIG. 9, various embodiments of systems and methods for counting and tracking people will be described. As illustrated, a system 900 includes monitoring components 910 and at least one wireless tag 950. The monitoring components 910 include image capture and object tracking components 912, wireless communication components 914, data buffers 920 for storing monitoring data, data extraction modules 930, matching module 940 and an analytics system 942. In various embodiments, the monitoring components 910 may be implemented in one or more computing systems, sensor systems, communications systems and/or other devices.

The wireless tag 950 includes wireless communications components 952 operable to communicate with the wireless communications components 914 through a wireless communications protocol, such as the Bluetooth Low Energy protocol. The wireless tag 950 also includes sensor components 954, such as an accelerometer 956, for generating sensor data associated with the movement of the wireless tag 950.

The image capture and object tracking components 912 include one or more image sensors operable to capture images of a scene and image processing modules operable to identify and track objects in the captured images to generate a stream of object track data 922. The wireless communications components 914 include a wireless sensor operable to receive communications from the wireless tag 950, including data from at least one sensor component 954, and generate a stream of wireless signal data 924 and a stream of sensor data 926. In various embodiments, the systems and methods described herein may be implemented with a single wireless sensor (e.g., Bluetooth BLE or WiFi sensor), which provides advantages over conventional systems that require multiple wireless sensors to determine a proximate location of a wireless device (e.g., by triangulation).

The data extraction modules 930 include a feature extraction module 932 operable to receive object track data 922, determine feature characteristics associated with object movement events, and output time stamped object track event data to a matching module 940. The wireless feature extraction module 934 is operable to receive wireless signal data 924, extract wireless feature characteristics associated with the location of the wireless tag 950, and output time stamped wireless feature characteristics to the matching module 940. The sensor feature extraction module 936 is operable to receive sensor data 926, extract feature characteristics associated with movement of the wireless tag 950, and output time stamped sensor feature characteristics for use by the matching module 940.

The matching module 940 is operable to analyze the feature characteristics data from the wireless feature extraction module 934 and the sensor feature extraction module 936 to determine whether one or more object tracks is associated with the wireless tag 950. In various embodiments, for example, the accelerometer 956 generates motion data that is transmitted to the monitoring components 910 through the wireless communications components 914. The sensor feature extraction module 936 may use the received sensor data to track motion characteristics such as velocity, acceleration, movement and other characteristics received or ascertained from the accelerometer 956 data. The feature extraction module 932 is operable to determine certain motion characteristics from the object track data, and the matching module 940 compares the measured motion characteristics from the accelerometer 956 to match wireless tag 950 data with an object track. It will be appreciated that the sensor components 954 may include other sensor types that collect motion statistics.

In various embodiments, the matching module 940 may identify whether a tracked object is moving at a certain time and match with accelerometer data indicating movement at the same approximate time. In another embodiment, the matching module 940 tracks a velocity of a tracked object and attempts to match the velocity with wireless tag velocity as measured by the accelerometer 956 or other sensor. The matching module 940 may search for matches between tracked objects and received sensor data at identified locations on the object track (e.g., entry into or exit from the field of view, closest distance from the monitoring components), at regular intervals (e.g., every 1 second), when an event is triggered (e.g., motion vs. stopped), or other times and locations. The sensor associated with a wireless tag and the object track data may be paired using a best data fit or other statistical matching algorithm. For example, accelerometer data (and/or wireless signal data/other sensor data) may be matched to a tracked object such that the two data sets are temporally aligned over the lifetime of the object track. A match can be determined based on a best data fit to available object tracks, a computed score for the match between the data sets that satisfies certain thresholds, Hidden Markov models, or other procedures and criteria.

The object track data 922 and matching module 940 determinations may then be used by the analytics system 942 to compute further data regarding the objects tracked by the image capture and object tracking components 912. For example, in a people counting and tracking embodiment, the analytics system 942 may be operable to identify tracked objects (e.g., people) as customers or employees based on the results of the matching module 940, and separate employees from customers when generating resulting analytics.

Using track analytics, the system may determine higher level correspondences calculated from the object metadata obtained during object tracking. For example, the monitoring system in a retail store environment may generate data corresponding to the number of customers waiting at a point-of-sale register at any point in time, the amount of time the customers have waited, and customers entering and exiting the retail store. By identifying tracked objects as employees or customers, the more reliable retail analytics may be achieved. As described above, the correlated image and wireless data generally comprises a combined set of data in which images and their associated metadata has been time-correlated and wireless data correlated to wireless signal information is synchronized therewith. Thus, a combined data set that enables indexing, searching, and viewing of various types of data in any of the images is generated and stored, including a classification of employees and customers. It will be appreciated that the monitoring systems and methods described herein may be used in other environments, where classification of tracked objects (e.g., people) is desired.

Accordingly, it will be understood that various embodiments of the present system described herein are generally implemented as a special purpose or general-purpose computer including various computer hardware as discussed in greater detail below. Embodiments within the scope of the present invention also include computer-readable media for carrying or having computer-executable instructions or data structures stored thereon. Such computer-readable media can be any available media which can be accessed by a general purpose or special purpose computer, or downloadable through communication networks. By way of example, and not limitation, such computer-readable media can comprise physical storage media such as RAM, ROM, flash memory, EEPROM, CD-ROM, DVD, or other optical disk storage, magnetic disk storage or other magnetic storage devices, any type of removable non-volatile memories such as secure digital (SD), flash memory, memory stick etc., or any other medium which can be used to carry or store computer program code in the form of computer-executable instructions or data structures and which can be accessed by a general purpose or special purpose computer, or a mobile device.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data which cause a general purpose computer, special purpose computer, or special purpose processing device such as a mobile device processor to perform one specific function or a group of functions.

Those skilled in the art will understand the features and aspects of a suitable computing environment in which aspects of the invention may be implemented. Although not required, the inventions are described in the general context of computer-executable instructions, such as program modules or engines, as described earlier, being executed by computers in networked environments. Such program modules are often reflected and illustrated by flow charts, sequence diagrams, exemplary screen displays, and other techniques used by those skilled in the art to communicate how to make and use such computer program modules. Generally, program modules include routines, programs, objects, components, data structures, etc. that perform particular tasks or implement particular abstract data types, within the computer. Computer-executable instructions, associated data structures, and program modules represent examples of the program code for executing steps of the methods disclosed herein. The particular sequence of such executable instructions or associated data structures represent examples of corresponding acts for implementing the functions described in such steps.

Those skilled in the art will also appreciate that the invention may be practiced in network computing environments with many types of computer system configurations, including personal computers, hand-held devices, multi-processor systems, microprocessor-based or programmable consumer electronics, networked PCs, minicomputers, mainframe computers, and the like. The invention is practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing the inventions, which is not illustrated, includes a general purpose computing device in the form of a conventional computer, including a processing unit, a system memory, and a system bus that couples various system components including the system memory to the processing unit. The computer will typically include one or more magnetic hard disk drives (also called "data stores" or "data storage" or other names) for reading from and writing to. The drives and their associated computer-readable media provide nonvolatile storage of computer-executable instructions, data structures, program modules, and other data for the computer. Although the exemplary environment described herein employs a magnetic hard disk, a removable magnetic disk, removable optical disks, other types of computer readable media for storing data can be used, including magnetic cassettes, flash memory cards, digital video disks (DVDs), Bernoulli cartridges, RAMs, ROMs, and the like.

Computer program code that implements most of the functionality described herein typically comprises one or more program modules may be stored on the hard disk or other storage medium. This program code, as is known to those skilled in the art, usually includes an operating system, one or more application programs, other program modules, and program data. A user may enter commands and information into the computer through keyboard, pointing device, a script containing computer program code written in a scripting language or other input devices (not shown), such as a microphone, etc. These and other input devices are often connected to the processing unit through known electrical, optical, or wireless connections.

The main computer that effects many aspects of the inventions will typically operate in a networked environment using logical connections to one or more remote computers or data sources, which are described further below. Remote computers may be another personal computer, a server, a router, a network PC, a peer device or other common network node, and typically include many or all of the elements described above relative to the main computer system in which the inventions are embodied. The logical connections between computers include a local area network (LAN), a wide area network (WAN), and wireless LANs (WLAN) that are presented here by way of example and not limitation. Such networking environments are commonplace in office-wide or enterprise-wide computer networks, intranets and the Internet.

When used in a LAN or WLAN networking environment, the main computer system implementing aspects of the invention is connected to the local network through a network interface or adapter. When used in a WAN or WLAN networking environment, the computer may include a modem, a wireless link, or other means for establishing communications over the wide area network, such as the Internet. In a networked environment, program modules depicted relative to the computer, or portions thereof, may be stored in a remote memory storage device. It will be appreciated that the network connections described or shown are exemplary and other means of establishing communications over wide area networks or the Internet may be used.

In view of the foregoing detailed description of preferred embodiments of the present invention, it readily will be understood by those persons skilled in the art that the present invention is susceptible to broad utility and application. While various aspects have been described in the context of a preferred embodiment, additional aspects, features, and methodologies of the present invention will be readily discernible from the description herein, by those of ordinary skill in the art. Many embodiments and adaptations of the present invention other than those herein described, as well as many variations, modifications, and equivalent arrangements and methodologies, will be apparent from or reasonably suggested by the present invention and the foregoing description thereof, without departing from the substance or scope of the present invention. Furthermore, any sequence(s) and/or temporal order of steps of various processes described and claimed herein are those considered to be the best mode contemplated for carrying out the present invention. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the present inventions. In addition, some steps may be carried out simultaneously.

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope. Accordingly, the scope of the present inventions is defined by the appended claims rather than the foregoing description and the exemplary embodiments described therein.

What is claimed is:

1. A system, comprising:
    a first image sensor operable to capture a stream of images of a first field of view;
    a wireless signal sensor operable to detect wireless signals emitted from at least one wireless device within an area comprising at least the first field of view; and
    a processing system operable to:
        process the stream of images and detect a plurality of objects within the first field of view;
        generate a plurality of object tracks, each object track representative of a movement of a detected object within the first field of view;
        determine, for at least one of the plurality of object tracks, a predicted wireless signal characteristic of a predicted wireless device following the at least one of the object tracks;
        process the detected wireless signals to determine a tracked wireless signal characteristic;
        match one of the plurality of object tracks with a detected wireless device based on a fit between the predicted wireless signal characteristic and the tracked wireless signal characteristic; and
        calculate a score representing a level of fit between the predicted wireless characteristic and the tracked wireless characteristic, wherein the score is based on a difference between a peak wireless signal strength and a lowest wireless signal strength, and wherein the at least one wireless device is associated with an object track if the score is greater than a predetermined threshold value.

2. The system of claim 1 further comprising a second image sensor operable to capture images of a second field of view, wherein each of the first image sensor and the second image sensor is configured to capture 2D images, and wherein the processing system is further operable to process the 2D images captured by the first and second image sensors to form a 3D image.

3. The system of claim 1 wherein the processing system is further operative to determine a physical location of the detected object based on an object location in the captured images.

4. The system of claim 1, wherein the wireless signal sensor is a Bluetooth Low Energy protocol sensor and the wireless signals are Bluetooth Low Energy protocol signals.

5. The system of claim 1, wherein the predicted wireless characteristic is a peak wireless signal strength and wherein the processing system is further operable to determine a location and a time along an object track where a peak wireless signal strength is predicted to be received from the predicted wireless device.

6. The system of claim 5, wherein the location and time where the peak wireless signal strength is predicted to be received corresponds to a shortest distance along the object track to the wireless sensor.

7. The system of claim 5, wherein the processing system is further operable to determine a time at which at least one wireless device had a peak signal strength, wherein the at least one wireless device is a wireless tag and the plurality of objects are people.

8. The system of claim 7, wherein the at least one wireless device is a wireless employee tag, wherein object metadata identifies each of the plurality of objects as one of an employee and a customer based on a determination of a match with the at least one wireless device, and wherein customer analytics are calculated for objects without an associated wireless identifier.

9. The system of claim 1, wherein the wireless device includes an accelerometer operable to provide motion data to the processing system, and wherein the processing system is further operable to determine which of the at least one wireless devices is moving and attempt to match a moving wireless device with one of the plurality of object tracks.

10. The system of claim 9, wherein the processing system is further operable to determine a velocity of the wireless device, determine a velocity of each object track, and incorporate such velocity information to determine a match between the object track and the detected wireless devices.

11. The system of claim 10, wherein the processing system is further operable to assign a first series of timestamps to measured velocities of the wireless device and a second series of timestamps to predicted velocities estimated for each object track, and wherein the processing system is further operable to match one of the plurality of object tracks with a detected wireless device by comparing velocities having contemporaneous timestamps.

12. A method comprising:
   capturing images, using a first image sensor, of a first field of view;
   receiving, using a wireless signal sensor, wireless signals emitted from one or more wireless devices within an area comprising at least the first field of view; and
   processing the captured images and wireless signals to identify and classify objects in the first field of view, the processing comprising:
      detecting in the captured images an object within the first field of view;
      generating an object track representative of a movement of the object within the first field of view;
      determining a predicted wireless signal characteristic of a predicted wireless device following the object track;
      processing the received wireless signals to determine a tracked wireless signal characteristic;
      matching the object track with a detected wireless device based on a fit between the predicted wireless signal characteristic and the tracked wireless signal characteristic; and
      calculating a score representing a level of fit between the predicted wireless characteristic and the tracked wireless characteristic, wherein the score is based on a difference between a peak wireless signal strength and a lowest wireless signal strength, and wherein a wireless device is associated with an object track if the score is greater than a predetermined threshold value.

13. The method of claim 12, further comprising determining a physical location of the identified object based on an object location in the captured images.

14. The method of claim 12, wherein the predicted wireless characteristic is a peak wireless signal strength and wherein the method further comprising determining a location and a time along the object track where a peak wireless signal strength is predicted to be received from the predicted wireless device.

15. The method of claim 14, wherein the location and time where the peak wireless signal strength is predicted to be received corresponds to a shortest distance along the object track to the wireless sensor.

16. The method of claim 14, further comprising determining a time at which a wireless device had a peak signal strength.

17. The method of claim 12, wherein the wireless device is a wireless employee tag and the object is a person, wherein object metadata identifies the person as one of an employee and customer based on a detected match between the object and a wireless device, and wherein customer analytics are calculated for objects without an associated wireless identifier.

18. The method of claim 12, further comprising:
   determining which wireless devices are moving and considering only such devices to match with the object track; and
   determining a velocity of the wireless devices and incorporating such information to match the object track with the detected wireless devices.

19. The method of claim 18, further comprising assigning a first series of timestamps to measured velocities of the wireless device and a second series of timestamps to predicted velocities estimated for each object track.

20. The method of claim 19, further comprising matching one of the plurality of object tracks with a detected wireless device by comparing velocities having contemporaneous timestamps.

* * * * *